(No Model.)
D. T. McINTYRE.
METALLIC RIPRAP.
No. 486,885. Patented Nov. 29, 1892.
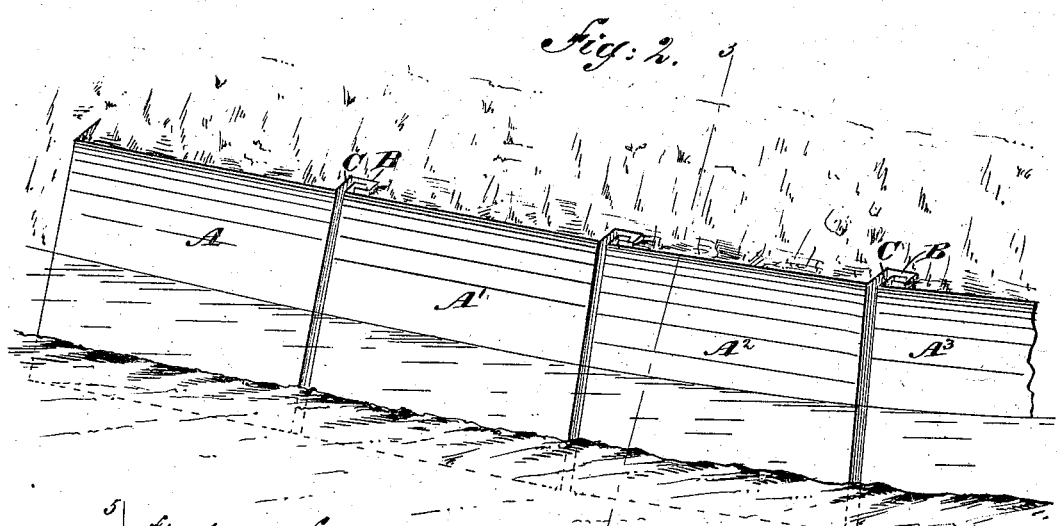
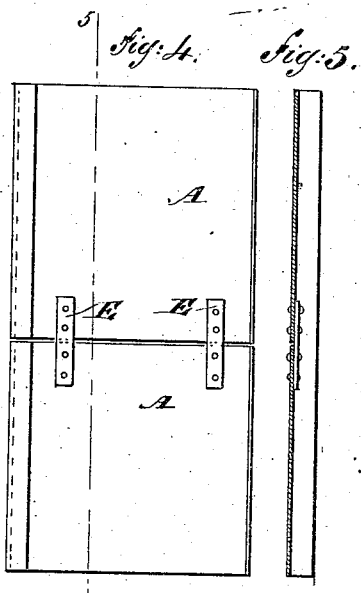
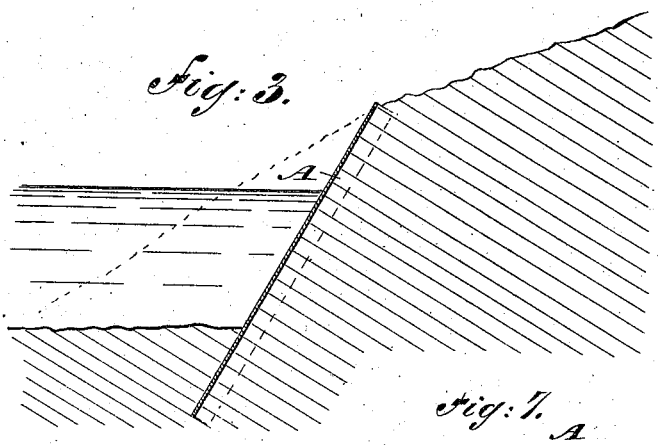
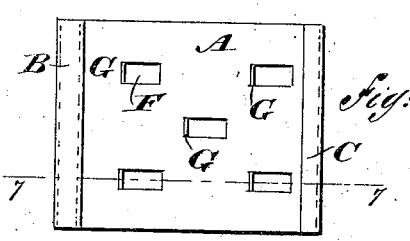
WITNESSES
Chas. Nida.
C. Sedgwick
INVENTOR
D. T. McIntyre
BY
Munn & Co.
ATTORNEYS

UNITED STATES PATENT OFFICE.

DUNCAN T. McINTYRE, OF MATTOON, ILLINOIS, ASSIGNOR TO HIMSELF, AND D. STUART McINTYRE, OF KNOXVILLE, TENNESSEE.

METALLIC RIPRAP.

SPECIFICATION forming part of Letters Patent No. 486,885, dated November 29, 1892.

Application filed November 23, 1891. Serial No. 412,733. (No model.)

*To all whom it may concern:*

Be it known that I, DUNCAN T. MCINTYRE, of Mattoon, in the county of Coles and State of Illinois, have invented a new and Improved Metallic Riprap, of which the following is a full, clear, and exact description.

The invention relates to devices for protecting the banks, shores, and beaches of rivers, lakes, and other bodies of water from washing or being cut under or destroyed by the action of the water.

The object of the invention is to provide a new and improved metallic riprap which is simple and durable in construction and very easily and conveniently applied.

The invention consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a sectional plan view of the improvement. Fig. 2 is a perspective view of the improvement as applied. Fig. 3 is a transverse section of the same on the line 3 3 of Fig. 2. Fig. 4 is a side elevation of two plates fastened together for high shores or beaches. Fig. 5 is a transverse section of the same on the line 5 5 of Fig. 4. Fig. 6 is a face view of a plate of modified form. Fig. 7 is a sectional plan view of the same on the line 7 7 of Fig. 6.

The improved metallic riprap is composed of a series of metallic plates A A' A² A³, placed one alongside the other on the sloped or inclined beach, shore, or bank, as is plainly shown in Fig. 2. The lower ends of the several plates preferably pass into the bottom of the bed of the body of water and the upper ends extend above the level of the water, as is plainly shown in Fig. 3. The ends of the several plates are preferably interlocked with each other, so as to form a continuous metallic wall on the shore or beach, the interlocking being accomplished by forming one end of each plate with an interlocking flange B, adapted to be engaged by an L-shaped interlocking flange C, formed on the end of the next following plate. The commencing and end plates in the series of plates have their outer ends formed with right-angular flanges D, passing into the ground of the slope, as shown in Fig. 2. In preparing the metallic wall the first plate A is set in position on the slope at the upstream end of the water and then the next plate A' is engaged by its flange C with the top of the interlocking flange B and then the plate A' is slipped downward on the slope with the two flanges C and B interlocking one another. The next following plates are applied in a like manner—that is, one is interlocked with the preceding one until the wall along the entire beach has been formed. In case the slope is of very great height several metallic plates are fastened one above the other by suitable connections E until the upper end of the top plate extends above the water-level. In order to securely hold the plates in place and also to permit backwater to drain into the body of water, the plates are preferably perforated, so that the water in the ground at the back of the wall can pass through the openings F into the body of water. In forming the openings F in each plate a lip G is produced by cutting three sides of the opening and then bending the part back to form the lip, which preferably extends at right angles to the plate and rearward to pass into the ground of the slope. The several lips G prevent sidewise displacement of the plates by the action of the current of water, so that the wall is securely held in place without any other means.

By the above-described construction I not only provide a protecting-surface to the bank which is practically an improved sheet-piling, but produce integral vertical posts by means of the interlocking joints, the posts serving to strengthen and support the structure when embedded in the bank, and thereby avoiding the necessity of separate supporting posts or piles.

Having thus described my invention, I claim as new and desire to secure by Letters Patent—

1. The herein-described riprap, consisting of metallic plates having continuous vertical integral strengthening-posts formed by their interlocked vertical meeting edges, substantially as described.

2. The herein-described riprap, consisting of inclined metallic sheets resting against the face of the bank to be protected, the said sheets having their vertical meeting edges interlocked and formed into posts at the rear or inner surface of the structure, the posts being embedded in the bank and thereby avoiding the use of separate posts, substantially as described.

3. A riprap composed of a series of interlocked metallic plates having perforations, substantially as shown and described.

4. A riprap composed of interlocked metallic plates having rearwardly-extending lips punched through from the outer side of the plates and adapted to pass into the ground of the slope, substantially as shown and described.

5. A riprap composed of a series of interlocked metallic plates having perforations and rearwardly-extending lips adapted to engage the ground of the slope, substantially as shown and described.

DUNCAN T. McINTYRE.

Witnesses:
D. W. EWING,
N. B. ALLISON.